Nov. 3, 1959   G. L. LEITHISER, JR   2,911,098
CONTINUOUS ROTARY PRESSURE FILTER AND METHOD
AND MEANS OF CONTROLLED SEPARATION
OF SOLIDS AND LIQUID FROM SLURRY
Filed Jan. 17, 1956   4 Sheets-Sheet 1

INVENTOR
George L. Leithiser, Jr.

BY
ATTORNEY

Nov. 3, 1959  G. L. LEITHISER, JR  2,911,098
CONTINUOUS ROTARY PRESSURE FILTER AND METHOD
AND MEANS OF CONTROLLED SEPARATION
OF SOLIDS AND LIQUID FROM SLURRY
Filed Jan. 17, 1956  4 Sheets-Sheet 2

INVENTOR
George L. Leithiser, Jr.

BY
ATTORNEYS

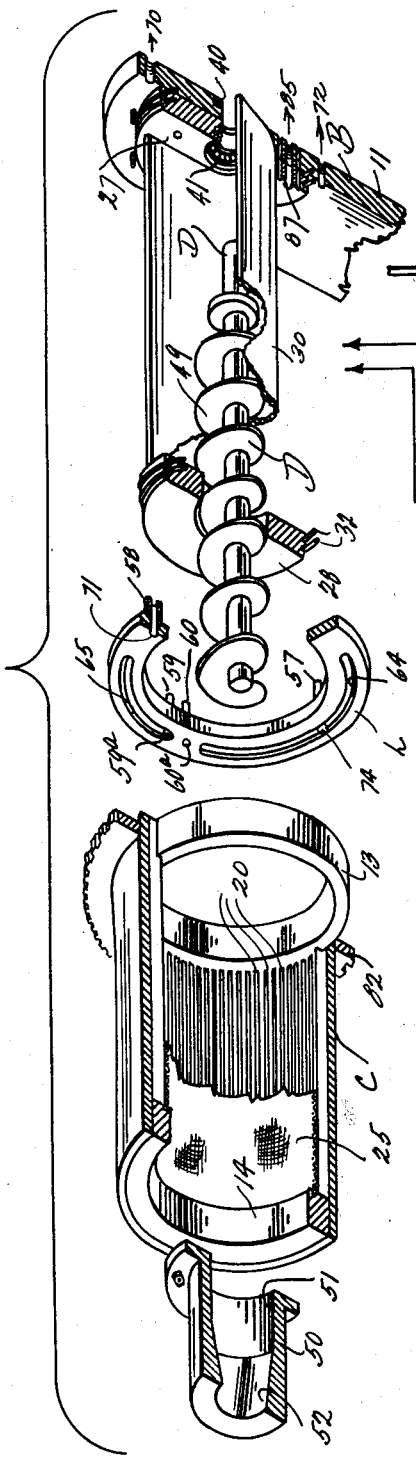

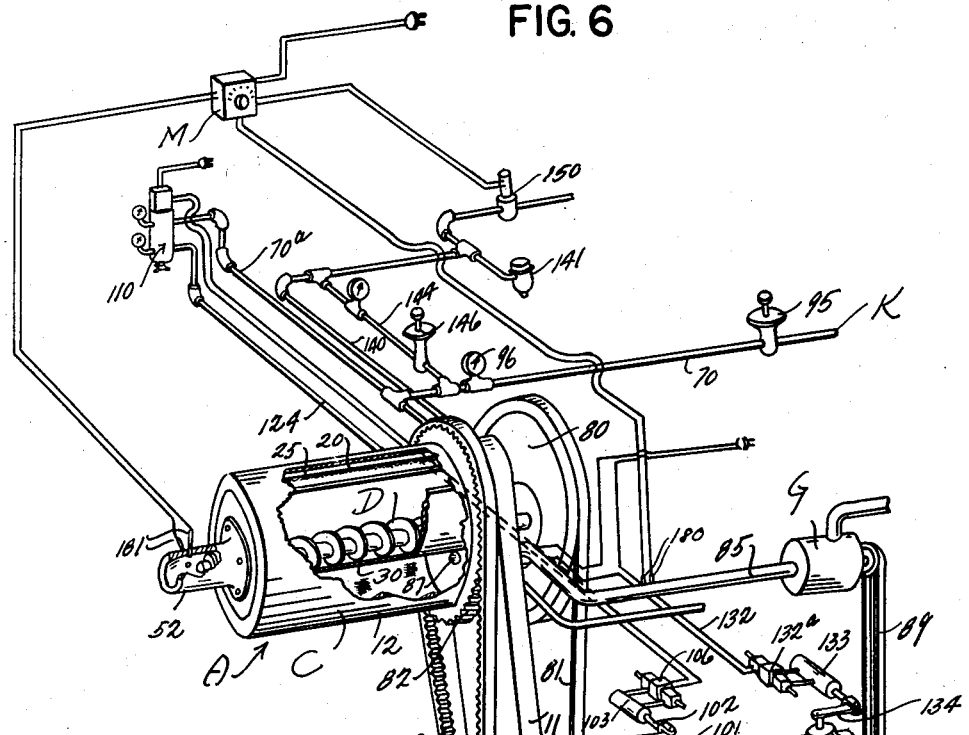

United States Patent Office 2,911,098
Patented Nov. 3, 1959

2,911,098

CONTINUOUS ROTARY PRESSURE FILTER AND METHOD AND MEANS OF CONTROLLED SEPARATION OF SOLIDS AND LIQUID FROM SLURRY

George L. Leithiser, Jr., Columbia, Pa.

Application January 17, 1956, Serial No. 559,610

7 Claims. (Cl. 210—107)

This invention relates to a filter and a method of continuously separating solids and filtrate from a slurry, under controlled conditions which will produce the maximum quantity of filtered product in the shortest time and at the lowest cost.

Industrial filters are commercially divided into two general classifications, as follows:

(A) The batch type in which slurry is introduced into the filter under pressure and in which the solids are trapped upon the filter medium. A severe disadvantage of the batch type of filter is the necessity of periodic shutdowns for cake cleaning. High pressure can be used in batch filtering, under circumstances where the solids are formed of small particle size, but it is impossible to economically filter a cake of proper thickness. Invariably cakes are so thick that they act as a barrier to liquid passage.

(B) The drum type continuous filter does not necessitate periodic shutdowns for cake cleaning. Ordinarily the drum is covered on its outer surface with a filter medium and the interior of the drum is subjected to vacuum. This pulls the liquid through the filter medium; the solids collecting externally on the drum from which they may be removed in any approved manner. The disadvantage of this type of filter is that pressures applied to cause filter action are limited to the neighborhood of 25 pounds per square inch.

It is therefore an object of the present invention to provide a continuous rotary pressure filter which can utilize reasonably high superatmospheric pressures for filtering and with which a maximum quantity of both solids and filtrate may be separated in the shortest time, and at lowest cost, with a controlled clarity of the effluent or filtrate and a controlled dryness or moisture content of the end product solids.

A further object of this invention is the provision of an improved continuous rotary pressure filter having automatic controls for regulating the speed of rotation of the filter; the degree of thickness, porosity or intensity of the solid cake formed upon the rotary filter; and the control of clarity of the filtrate and dryness of the filtered solid product.

A further object of this invention is the provision of improved electrically actuated controls for automatic regulation of the time lapse in separating solids and effluent from a slurry; controlling the level of slurry during the filter action; and controlling the cake thickness and dryness of solids separated from the slurry.

Other objects and advantages of this invention will be apparent during the course of the following detailed description.

In the accompanying drawings, forming a part of this specification, and wherein similar reference characters designate corresponding parts throughout the several views:

Figure 3 is a developed perspective view, partly in section, of the endwise separated details of the rotary filter.

Figure 4 is a fragmentary perspective view, partly in section, showing certain related features of the filter cylinder and valve ring for controlling admission of pressures and slurry to the rotary cylinder of the filter.

Figure 5 is a side elevation of a valve ring used as part of the filter equipment.

Figure 6 is a diagrammatic perspective view of the rotary filter and the operating controls thereof.

Figure 7 is a diagrammatic view of mechanical and electrical control means for varying the speed of rotation of the rotary cylinder.

Figure 8 is a diagrammatic view of mechanical and electrical control means for regulating filtering pressures in the cylinder in order to control the moisture content of the end product solids.

Figure 1:
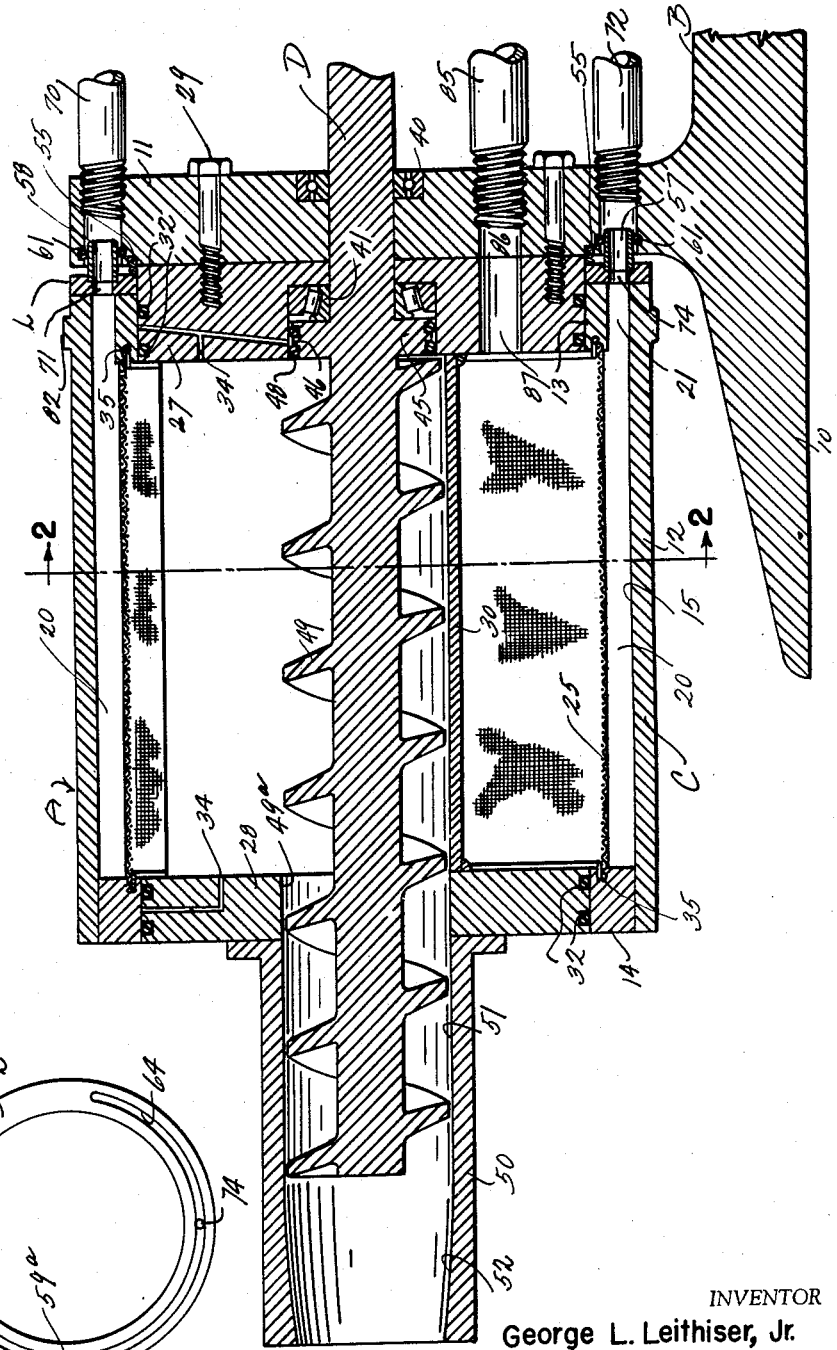
Figure 1 is a longitudinal cross sectional view taken through the improved rotary filter showing associated parts thereof.

In the drawings, the letter A may generally designate the entire assembly. It may include a supporting frame B; cylindrical rotary casing construction C; and cake ejecting means D. A prime mover E is provided, having variable speed means F for the drive of the rotary cylinder portion of the means C. Pump means G is provided for introducing slurry into the cylinder of the means C, having associated therewith variable speed means H for regulating the quantity of slurry forced by the pump G into the cylinder in order to maintain a constant level. An air pressure supply means K is provided. A valve ring L is associated with the cylinder and casing construction in order that various degrees of drainage of effluent and air pressures or vacuum may be applied to the cake in any sector of the operating cycle. Pressure modifying means M is provided to control the moisture content of the solids end product.

The supporting frame B may consist of a base structure 10 having an upstanding standard or plate 11 as a part thereof. The latter may support the rotary cylinder and other details of the means C forming the casing structure of the continuous rotary filter.

The rotor comprises a cylindrical shaped tube 12, preferably disposed upon a horizontal axis. Within its ends the tube 12 is provided with fixed rings 13 and 14. The material of the tube 12 and the end rings 13 and 14 may be the same and capable of withstanding high internal pressures. The inner peripheral wall 15 of the tube is provided with thin relatively spaced fins or strips 20 completely surrounding the inner periphery of the tube 12. These fins are radial and parallel the axis of the tube. Their ends abut against the rings 13 and 14 to which they may be secured if desired. The matter of forming these fins is not important. They may be sweated in place by means of solder, tin or copper brazing or the slots may be formed by milling, coring or casting. The important feature is that a lengthwise slotted surface be provided.

It will be noted that the fins 20 at their reduced forward ends 21 are opened to the valve ring L for a purpose which will be subsequently described. The ring 13 is fixed in place with respect to the drum 12 by being welded or otherwise secured to the extreme ends 21 of the fins. The channels formed by the spaces between the fins 20 form passageways for the filtrate in order that it may be discharged at the end of the tube. The inner edges of these fins form a cylindrical internal surface which may be covered with any suitable filter medium 25, such as cloth, wire screening, etc., the porosity of which may be regulated according to the type of slurry to be treated. It is entirely within contemplation of this invention to form this slotted filtering surface and medium externally upon the tube, if external pressurizing is used. Under such condition the cake removal means must be located externally of the cylinder and not within the cylinder.

The casing structure forming the drum also includes front and rear stationary end caps 27 and 28, either or both of which may be secured to the frame structure B, as by welding or bolting as shown in 29 in Figure 1 for plate 27.

The end plates 27 and 28 are preferably connected in endwise spaced relation by a U-shaped hopper structure 30 into which the cake falls onto the helical flights of the worm portion of the shaft D. The ring portions 13 and 14 of the rotary cylinder have a sliding ground fit (preferably a lapped joint) upon the peripheral outer surfacing of the end plates 27 and 28, upon which they bear. The bearing contact may be sealed at 32. Ducts 34 lead to the bearing surfaces of the cylinder rings upon the end plates 27 and 28. They open internally of the pressure chamber.

The filter media 25 may have to be removed occasionally, and to that end it may have its ends secured, as by rings 35 in suitable annular recesses upon the internal sides of the rings 13 and 14, as shown in Figure 1.

The shaft D has a bearing 40 in the frame plate 11 and a thrust bearing 41 upon the end plate 27. It is provided with a bearing flange 45 having contact with the central opening 46 of end plate 27. Pressure seals 48 may be provided at this location. Helical flights 49 of the worm of the shaft D extend from the end plate 27 through the passageway 49a of end plate 28 and into an extruding nozzle 50. The latter may be welded or otherwise secured to the stationary end plate 28, as shown in Figure 1. The shaft D and spiralling flights 49 end within the passageway 51 of the nozzle 50. The passageway 51 from that point to the outlet is reducingly tapered at 52 in order to exert a back pressure on the cake being discharged. If desired, the back pressure may be accomplished by other means such as a spring loaded plug or gate.

Figure 2:
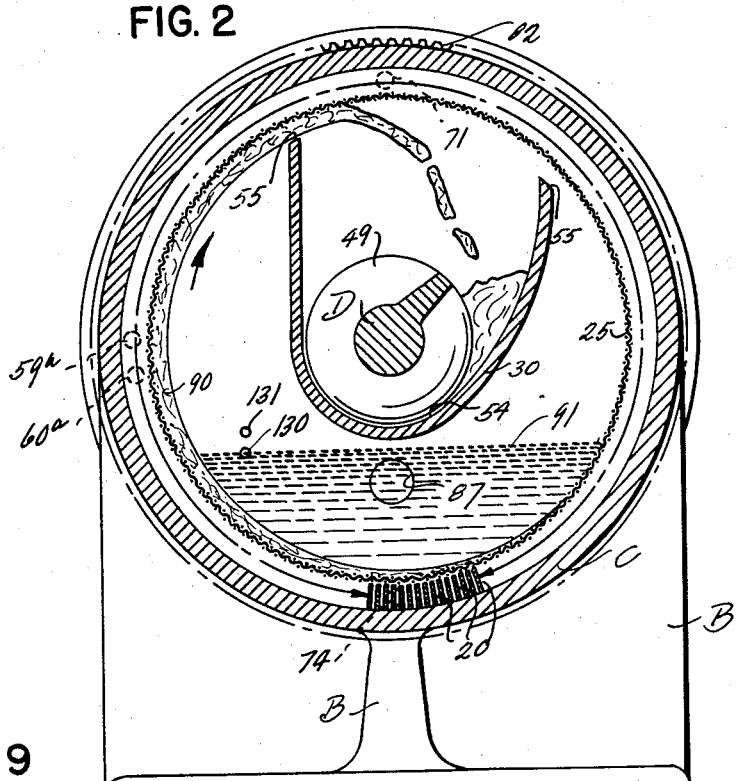
Figure 2 is a transverse cross sectional view taken through the rotary filter of Figure 1 substantially on the line 2—2 of Figure 1.

The construction of the U-shaped hopper 30 will be noted from the cross sectional view of Figure 2. The outer edges of the flights 49 are closely spaced from the bottom of the chamber 54 of the hopper. The top edges 55 of the hopper are appreciably spaced from the filter screen 25 to permit cake formation of proper thickness.

Valve ring L is non rotatable and endwise floatable. As shown in Figure 1 it is relatively thin and resiliently urged by springs 55, located in suitable seats of the frame plate 11, into sealing engagement against the end surface of the drum 12, fins 20 and the outer side of the ring 13. It is prevented from rotating by porting tubes 57 and 58 which are shown in Figure 1. These tubes are an integral part of the ring L and in addition to them there are provided two other porting tubes 59 and 60, shown in Figure 3 of the drawing, the purposes of which will be subsequently described. These porting tubes 57, 58 and 59 and 60 are slidably fitted into openings in the standard 11 wherein they are sealed by conventional O-rings 61. One purpose of the ring valve L is to provide communicating passageways to any desired sector of the fin terminations 21, as the cylinder rotates. It is provided with arcuately grooved passageways 64 and 65 (see Figure 5) which communicate progressively with the spaces or slots between the ends of the fins as the cylinder rotates. These grooves have ports leading to the outside of the end cap 27 in order that various degrees of drainage of effluent and air pressures or vacuum may be applied to the solids cake. An air pressure line 70 is connected to the frame plate 11, as shown in Figure 1, for entrance of air under pressure through the porting tube 58 and the port 71 into the slots or spaces between the fins 20 radially outwardly of the screen 25, as will be apparent from Figure 1. An effluent discharge or drain line 72 is connected in the frame plate 11 communicating with the porting tube 57 and the arcuate passageway 64, at 74, as shown in Figures 1 and 5.

The porting tube 60, as shown in Figure 3 has an entrance opening at 60a upon the inner face of the valve ring L, for a purpose to be subsequently described. The porting tube 59 has an opening at 59a in the lower end of the arcuate groove 65 of the valve ring L, as is shown in Figures 3 and 5, the purpose of which will subsequently be described.

Referring to the more or less diagrammatic perspective view of Figure 6, the prime mover E is mounted upon the base 10 of frame B. It has one end shaft connected to the speed regulating means F which rotates the shaft D as well as the cylinder 12. The shaft D may be provided with a pulley or wheel 80, belt driven at 81 off of the shaft of the speed control mechanism F. The cylinder 12 has suitable gearing 82 meshing with the internal teeth of a flexible belt 83 which is likewise driven off of the shaft extending from the speed regulating means F.

It will be noted from Figure 1 that a slurry feed line 85 is connected to the plate 11. It has a port 86 which opens to a suitable port 87 of end plate 27 for feeding slurry into the lower part of the cylinder 12 between the filter media 25 and the bottom of the hopper 30. The slurry is force fed into the cylinder by means of the pump G (Figure 6). The latter may be belt driven at 89, off of a shaft extending from the speed regulating mechanism H. The latter is driven by the prime mover E.

Broadly, the speed regulating means F is controlled through variation in pressures existing in the cylinder at opposite sides of the solids cake 90 in a manner which will be subsequently described. The speed regulating mechanism H is regulated by the level 91 of slurry in the cylinder, as shown in Figure 2. This is accomplished in a manner to be subsequently described. The air pressure line 70 is provided with a suitable pressure reducing valve 95 as shown in Figure 6, and a pressure determining gauge 96 may also be provided in said line.

Referring to controls of the variable speed means F for rotating the cylinder 12 and shaft D from the prime mover and particularly referring to Figure 7: assuming that the filter drum or cylinder 12 is rotating clockwise looking at the machine from the cake discharge end, the slots between the fins will pass the port 60a shown in Figures 3 and 5 and in dotted lines in the assembled cross sectional view in Figure 2, at a point where the cake 90 is emerging from the slurry. Air under pressure is fed into the cylinder above the slurry through port 71. It will pass through the cake 90 and may escape through the port 60a under certain conditions. Assuming that the pressure from line 70 is 100 pounds per square inch and the desired pressure drop across the cake to be 10 pounds for optimum results, pressure will be reduced at the filtrate side of the cake to 90 pounds per square inch. This differential in pressure is utilized by the means shown in Figure 7 to control the cylinder rotating speed of the shaft leading off from the speed control F. It will be noted from Figures 6 and 7 that the speed varying mechanism F includes a shaft 100 having a lever 101 which is clevis connected to an air actuated piston and the piston rod assemblage 102 operating within a cylinder 103. Air lines 104 and 105, as shown in Figure 7, may be connected to a solenoid controlled four way valve 106 into which air pressure is fed from a desired source (not shown). These lines 104 and 105 connect in the cylinder 103 at opposite sides of the piston head.

A pressure differential switch construction generally designated at 110 is provided, as detailed in Figure 7. It consists of a casing 111 having a chamber 112. It supports a flexible diaphragm 113 between the ends of chamber 112, subdividing the chamber into a lower portion 112a and an upper portion 112b. Gauges 113a and 113ᵇ are respectively provided for determining the pressures existing in the chamber portions 112ᵃ and 112ᵇ respectively. An air bleeder vent 114ᵃ is provided in the chamber 112ᵃ to permit effective diaphragm operation. The low pressure side of the diaphragm 113 has a spring 114 connected centrally thereto, the tension of which is regulated by screw 115. The latter is threaded in the end of casing 111, as shown in Figure 7. To the diaphragm 113 is connected a rod 116 for operating a double throw switch 117 for controlling current supply to the coils 119 and 120 of a solenoid valve construction disposed in the casing 106. Air pressure from the line 70 is piped to the chamber portion 112ᵇ through a line 70ᵃ connected to the nipple 121 shown in Figure 7. In the example above given, this pressure in the chamber 112ᵇ will be 100 p.s.i. The casing 111 has a nipple 122 opening into the chamber portion 112ᵃ and to this nipple 122 a pressure transmittal line 124 is connected. Line 124 extends to the porting tube 60 so that the pressure existing at the outer side of the cake in the cylinder may be transmitted to the chamber 112ᵃ. If the desired 10 pound pressure drop exists the double throw switch 117 will be in equilibrium as shown in Figure 7. It is then known that the pressure cylinder is rotating at the proper speed. If a slurry having a high percentage of solids is now introduced into the cylinder, a thicker cake will tend to build up. This will increase the pressure drop at the outer side of the cake. The diaphragm 113 will move downward pulling the stem 116 downward and causing the switch arm 117 to make engagement with the contact 125. The circuit to the solenoid valve coil 120 will then be completed causing the valve to admit air to the cylinder 103. This causes the piston rod to move the control lever of the variable speed transmission F causing the filter cylinder to rotate faster. As the filter tube or cylinder increases its rotation the cake will have less time in the slurry and therefore will not build up to as great thickness as during slower rotation. This condition will decrease the pressure drop across the cake. When it comes back to the 10 pound differential desired the diaphragm will move back to normal position and current flow through contact 125 will be broken. If the pressure drop goes below 10 pounds, the switch arm 117 will make engagement with the other contact 128 for moving the solenoid valve and operating the speed transmission for slowing down rotation of the filter cylinder. While reference has been made to thickness of the cake in respect to causing differential in pressure, actually the density of the cake controls this variation in pressure.

The pump G has a pressure capacity greater than the operating pressure of the filter. It will therefore supply slurry to the interior of the rotating cylinder at a rate determined and controlled by the liquid level of the slurry in the cylinder. It will be noted from Figure 2 that suitable electrodes 130 and 131 are placed in the filter drum 12 at the inner side of the location where the cake is formed. In lieu of electrodes an electronic liquid level control may be provided at this location. If electrically operated, suitable lines 132 lead therefrom (see Figure 6), operating solenoid valve means indicated at 132ᵃ. This moves air pressure controlled piston means 133, and through leverage mechanism 134 the variable speed transmission H will be actuated, and thus regulate the speed of pump G in order to maintain the level of slurry constant in the filter cylinder.

A means for controlling the moisture content of the solids end product is shown diagrammatically in Figures 6 and 8. Generally the moisture is removed from the cake prior to discharge from the machine through a back pressure control means. Referring to the valve ring L the port 59ᵃ opens into the arcuate slot 65. This control is used only in filtering materials which require additional drying after emerging from the level of the slurry. Some materials, such as ceramic clay will filter successfully at high pressures if the cake is formed wet or while in the slurry. For further drying the pressure must be reduced to prevent certain deleterious compacting of the crystalline structure of certain components of such mixture. This condition is met by applying back pressure to the port 59ᵃ. Assuming that the internal pressure of the filter is 100 p.s.i., a back pressure of 50 p.s.i. may be applied from the air supply to the port 59ᵃ. This will result in a drying pressure of 50 p.s.i. being applied to the cake during that portion of its travel when it is passing the arcuate manifold or passageway 65 of the valve ring L. The effluent filtered out during this part of the drying process will drain through the port 59ᵃ.

Referring to Figure 6, it will be noted that a pipe line 140 is shown. This has direct connection with the valve port 59ᵃ. Line 140 has a connection with a float type commercial steam trap 141 (see Fig. 8). To provide the volume of air necessary to effect proper drying and to control that volume for maintaining the desired moisture content, I provide a pipe connection 144 leading off from the main air supply line 70. It has a pressure reducing valve 146 for reducing the pressure to the desired extent, say 50 p.s.i. This line 144 has connection with the line 140 leading to the moisture trap 141. To provide for the necessary air discharge a solenoid valve 150 is connected in the extension of line 140, as shown in Figures 6 and 8. It may be controlled by any type of electrical or electronic relay, operated by the differential of two electrical resistance. In the diagram of Figure 8 the resistance 160 may represent a cake emerging through the filter discharge nozzle 52, and resistance 161 may represent the slurry being fed into the filter tube. The effluent being an electrical conductor will, through loss in the filter, cause a representative difference in resistances between that in the slurry and the emerging cake. By means of the potentiometers 162 and 163, the circuit will be calibrated to be in electrical balance when the emerging cake is of the desired moisture content. If the cake emerges too dry the electrical resistance represented by 160 will increase causing the current passing through the electromagnet 164 to decrease and allowing the contact armature 165 to be attracted towards electromagnet 166. In so doing the contact between 165 and 167 is broken, de-energizing the coil of solenoid valve 159 and allowing the valve to close. This stops flow of air through the discharge line 170 and passage of air through the cake in the filter through the port 59ᵃ is stopped. The cake will then be discharged with a higher moisture content, which will reverse the function of the control, maintaining an average moisture content within the desired limits. It is shown in Figure 6 that contacts 180 are provided in the slurry line 85 representing the resistance 161, and electrodes 181 are provided in the nozzle 52 of the filter for the resistance 160 representing the cake material.

It will be noted from Figure 2 that the air inlet port 71 of the valve ring L is located at the top of the filter mechanism. The incoming rush of air, assisted also by gravity, will cause the cake 90 to break as indicated in Figure 2 and fall into the hopper 30. It is moved therealong into the discharge nozzle 50.

It will be apparent from the foregoing that the continuous rotary pressure filter of this invention has controls which are so complete as to automatically provide for a maximum quantity of the solid product of filtration in the shortest time and at lowest cost.

Figure 9:
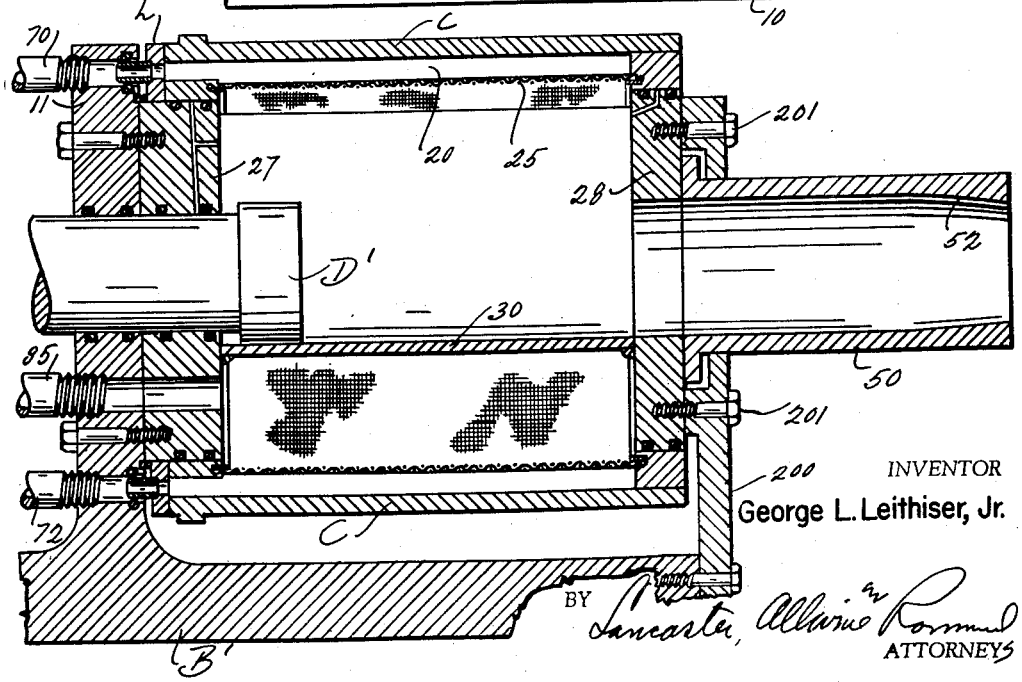
Figure 9 is a fragmentary longitudinal cross sectional view taken through a filter, such as shown in Figure 1, but having a ram type of solids discharging means.

In lieu of using a worm for discharge of the cake, I may use a ram D′ (Figure 9) for feeding the cake material into the nozzle 50. In this form of invention I have shown that it is possible to extend the base at 200 for bolting at 201 to the end plate 28 at the discharge end of the machine. This construction may be also used for the form of filter shown in Figure 1.

Various changes in the shape, size and arrangement of parts and variations in and to the steps of the methods herein set forth may be made without departing from the spirit of the invention or scope of the claims.

I claim:

1. In a filtering machine for separating solids and liquids from a slurry the combination of a rotary cylinder having a filter medium connected therewith, means for superatmospheric pressure forcing of liquids through the filter medium for collection of solids upon the filter medium, means for the continuous feed of slurry to the cylinder, means for the continuous removal of solids from the filter medium and cylinder, means for the continuous removal of filtrate from the cylinder, means for controlling the speed for rotation of the cylinder and its filter medium by the differential in pressures existing at opposite sides of the solids cake collected upon the filter medium, and means for automatically maintaining the slurry level within the cylinder.

2. In a filtering machine for separating liquids and solids from slurry the combination of a rotary cylinder having a filter medium carried thereby for rotation therewith, means for pressure forcing of liquid through the filter medium for collection of solids upon the filter medium, means for the continuous feed of slurry to the cylinder, means for continuous removal of solids from the filter medium, means for the continuous removal of filtrate from the cylinder, means for controlling the speed of rotation of the cylinder and filter medium through degree of porosity of solids collected upon the filter, means for automatically regulating a predetermined level of slurry within the cylinder, and means for controlled removal of moisture from solids formed upon the filter medium above the slurry level within the cylinder.

3. In a continuously operating type of filtering machine the combination of a supporting frame, a rotary cylinder mounted upon the frame, filtering means mounted internally of the cylinder circumferentially therearound including narrow slots extending longitudinally of the cylinder with the slots radially opening in the direction of the axis of the cylinder, means for feeding slurry into the cylinder to a predetermined level at a location in the cylinder within the confines of the filtering means, an air pressure supply, means for feeding superatmospheric air pressures into the cylinder at an end thereof through the slots of said filtering means at a location above the normal level of slurry in the cylinder, means for continuous removal of filtrate from between the slots throughout the sector of said slots where they are submerged in the slurry, a hopper having an opened top located in the cylinder inside of the filtering means above the slurry level for receiving the solids collected upon the filtering means, and means for the continuous ejection of such solids from said hopper and cylinder.

4. A filtering machine as described in claim 3 in which means is provided for sealing the cylinder against loss of air pressures, and wherein means is provided for maintaining desired pressure differentials at opposite side of the solids formed upon said filtering means above the slurry level.

5. In a filtering device for filtering solids and liquids from a slurry the combination of a supporting frame, a rotary cylinder, means rotatably mounting the cylinder on a horizontal axis upon said frame, the cylinder having a chamber provided with elongated parallel slots radially facing the axis of the cylinder around the internal walls of the cylinder, means for feeding slurry to the rotary cylinder at a location radially inwardly of said slots, means for removing filtrate from the end of the cylinder from said slots throughout a desired lower segment of said cylinder, means for pressure feeding of air into the upper portion of the cylinder endwise into said slots during rotation of the cylinder, an opened top hopper mounted in said cylinder against rotation positioned to receive the solids material separated from the inner walls of said cylinder during rotation as air is forced through said slots into the cylinder, and means for the continuous ejection of solids and filtrate from said hopper and cylinder.

6. A filtering machine as described in claim 5 in which the chamber of the cylinder is sealed against loss of desired superatmospheric pressures and wherein means provides a back pressure upon the discharging end product solids.

7. The steps in the separation of solids and liquids from slurry which consists in the pressure filtering of slurry to provide a filtrate and a solids cake while automatically controlling the density of cake formation through differential of pressure existing at opposite sides of the cake and at the same time automatically controlling the moisture content of the end solids product through moisture differentials of the slurry to be treated and that of the solids end product.

References Cited in the file of this patent

UNITED STATES PATENTS

| 1,346,898 | Kingsbury | July 20, 1920 |
| 1,870,442 | Coley | Aug. 9, 1932 |
| 2,014,144 | Mensing | Sept. 10, 1935 |
| 2,321,455 | Bryne | June 8, 1943 |
| 2,397,436 | Rosenquist | Mar. 26, 1946 |
| 2,679,936 | Bench | June 1, 1954 |
| 2,711,359 | Johansen | June 21, 1955 |

UNITED STATES PATENT OFFICE

CERTIFICATE OF CORRECTION

Patent No. 2,911,098                                             November 3, 1959

George L. Leithiser, Jr.

It is hereby certified that error appears in the above numbered patent requiring correction and that the said Letters Patent should read as corrected below.

In the grant, line 3, address of inventor, for "Columbia, Pennsylvania" read -- York, Pennsylvania --; in the heading to the printed specification, line 6, for "Columbia, Pa." read -- York, Pa. --; column 6, lines 28 and 29, for "resistance" read -- resistances --; column 7, line 13, for "for" read -- of --.

Signed and sealed this 9th day of February 1960.

(SEAL)
Attest:
KARL H. AXLINE
Attesting Officer

ROBERT C. WATSON
Commissioner of Patents